United States Patent [19]

Krause et al.

[11] Patent Number: 5,004,767

[45] Date of Patent: Apr. 2, 1991

[54] POLYMER COMPOSITIONS

[75] Inventors: Frank Krause, Kleve; Reinhard Kniewske, Fallingbostel, both of Fed. Rep. of Germany

[73] Assignee: Cerestar Holding B.V., Sas Van Gent, Netherlands

[21] Appl. No.: 324,828

[22] Filed: Mar. 17, 1989

[30] Foreign Application Priority Data

Mar. 21, 1988 [GB] United Kingdom ............... 8806692

[51] Int. Cl.$^5$ .................... C08L 3/02; C08K 5/04; C08K 5/07
[52] U.S. Cl. ........................ 524/30; 524/47; 524/48; 524/732; 524/734
[58] Field of Search ............ 524/732, 734, 30, 47, 524/48

[56] References Cited

U.S. PATENT DOCUMENTS

| | | | |
|---|---|---|---|
| 2,163,305 | 6/1939 | Dittmar | 524/734 |
| 3,769,248 | 10/1973 | Kovats | 524/734 |
| 4,171,407 | 10/1979 | Elser et al. | 524/734 |
| 4,560,724 | 12/1985 | Bradetz | 524/734 |
| 4,678,824 | 7/1987 | Lauria | 524/732 |
| 4,835,212 | 5/1989 | Degen et al. | 524/734 |

FOREIGN PATENT DOCUMENTS

| | | |
|---|---|---|
| 556214 | 9/1957 | Belgium . |
| 013444 | 3/1985 | European Pat. Off. . |
| 3613309 | 10/1987 | Fed. Rep. of Germany . |
| 58-87104 | 5/1983 | Japan . |
| 8806692 | 3/1988 | United Kingdom . |

OTHER PUBLICATIONS

Hackh's Chemical Dictionary 4th, 1969 Buffer-p. 114.
Kirk Othmers, "Encyclopedia of Chemical Technology", vol. 18, 2nd Edition, p. 682.
British Standard 5483:1977, pp. 11 and 13.

*Primary Examiner*—John Kight, III
*Assistant Examiner*—P. Hampton-Hightower
*Attorney, Agent, or Firm*—Cushman, Darby & Cushman

[57] ABSTRACT

The present invention relates to an aqueous acrylate polymer dispersion having a total solids content of 30 to 60% by weight polymerizing one or more acrylate monomers optionally together with other olefinically unsaturated monomer(s) in the presence of dextrin at least 70% of which has a molecular weight in the range of 1000 to 25000 and not more than 10% has a molecular weight above 25000.

10 Claims, No Drawings

POLYMER COMPOSITIONS

The present invention relates to acrylate polymer compositions in particular to aqueous dispersions of acrylate polymers and copolymers and to a method for their manufacture.

The polymerisation of acrylate monomers in aqueous dispersions and emulsions has been an established manufacturing practice for many years and the emulsions and dispersions so produced find widespread use particularly as adhesives in the building, paper, wood and textile industries.

The acrylate monomers which are used include acrylic acid and its derivatives, such as acrylamide and acrylic acid esters, as well as methacrylic acid and its corresponding derivatives. In addition, the polymer may also contain other olefinically unsaturated monomers notably ethylene or styrene. As well as the unsaturated monomers which form the polymer, an emulsion or dispersion of the polymer also comprises a substance which acts as a stabiliser to prevent the particles in the emulsion or dispersion coagulating and precipitating. Various compounds have been proposed for this purpose but whereas a polymer emulsion is prepared in the presence of an emulsifier which maintains both monomers and polymers in suspension a polymer dispersion is produced by dispersing the monomers by mechanical means and stabilising the dispersion of the polymer by means of a "protective colloid".

A number of substances are in use or have been suggested as protective colloids and among them are included starches and starch derivatives. German Offenlegungschrift 3323804 proposes that pregelatinised starch and degraded starches be used as protective colloids and specifically includes dextrins, produced by the acid hydrolysis of starch, in the latter category.

An earlier Belgian patent 556214 also describes the use of dextrins in the production of polymers of acrylic or methacrylic acid esters, the products being dispersions which are said to contain three types of polymeric species. These are unconverted dextrin, polymer in which acrylate or methacrylate chains are grafted on to the dextrin and homopolymers of the unsaturated esters.

The desirable properties sought in an aqueous dispersion of an acrylate polymer are as follows:
(a) A high content of total solids (30 to 60% by weight)
(b) A low viscosity to facilitate handling and use i.e. preferably a Brookfield viscosity of less than 2000 mPas at 20° C. more preferably less than 1000 mPas.
(c) A low content of residual unpolymerised monomers.
(d) A stable dispersion not showing signs of precipitation after 3 months storage.
(e) A low content of "grits" in the polymer emulsion i.e. preferably less than 0.05% when measured by the method described later in this specification. "Grits" are discrete particles of high molecular weight homopolymer.

We have conducted investigations into the dispersion polymerisation of acrylate monomers, particularly acrylate and methacrylate esters either alone or with other comonomers, in the presence of various starch derivatives particularly dextrins. We have found however that in order to obtain acceptable results with respect to the above properties only a specific class of dextrins are suitable and that to obtain the best results with this class of dextrins it is advisable to use a specific method of polymerisation.

Accordingly, the invention, comprises an aqueous acrylate polymer dispersion which has a total solids content of 30 to 60% by weight and which has been made by polymerising one or more acrylate monomers, optionally together with other olefinically unsaturated monomer(s) in the presence of a dextrin at least 70% of the dextrin having a molecular weight in the range of 1000 to 25000 and not more than 10% of the dextrin having a molecular weight above In the term "acrylate" in the preceding paragraph, as in this specification and claims as a whole, we include "methacrylate".

Preferably at least 80%, more preferably at least 85% of the dextrin has a molecular weight in the range 1000 to 25000. Preferably not more than 6% of the dextrin has a molecular weight above 25,000. It is also advantageous for the "dispersibility" of the dextrin to be less than 5 i.e. about 3. "Dispersibility" is the ratio of the weight average molecular weight of the dextrin $\overline{M}_w$ to the number average molecular weight $\overline{M}_n$ i.e. $\overline{M}_w/\overline{M}_n$. The method of determining the molecular weights is described later in this specification.

Dextrins are the degradation products of starches in which the amylose and amylopectin molecules in the starch are broken down by heating, with or without the addition of chemical reagents such as alkalis or acids so as to give molecules of shorter chain length which may remain as such or which may recombine to give new molecules. Depending upon the severity of the treatment dextrins with longer or shorter chains may be produced but a given dextrin will not be a unique chemical substance but will comprise a number of molecules of different chain lengths and hence of different molecular weights. It is preferred that the dextrin is pregelatinised since we have found that a pregelatinised dextrin gives a polymer dispersion with a reduced tendency to increase in viscosity on storage as compared with a polymer dispersion made from a similar dextrin which is not pregelatinised. The dextrin may be made from a natural starch or from a starch which has been conventionally modified or substituted. Thus, the starch may be modified by oxidation whereby aldehyde or carboxyl groups are introduced into the molecule. Other substituent groups which may be present in the starch molecule include ester groups such as acetyl, ether groups such as hydroxyethyl and hydroxypropyl and cationic groups such as tertiary aminoalkyl and quaternary ammonium alkyl.

The compositions according to the invention may contain up to 60% by weight dextrin based on the total solids in the dispersion preferably 15 to 60% more preferably 30 to 60% especially 35 to 50%. In DT-OS 3323804 it is said that high viscosity starches and starch derivatives may be used as protective colloids at a level of 3% by weight whereas low viscosity dextrins may be used up to 100% by weight and "medium viscosity" products 0.8 to 50% by weight. We have found however that the viscosity of the dextrin is not a guide to its effectiveness because dextrins of similar viscosity do not give polymer or copolymer dispersions with equivalent viscosity characteristics. We have also found that lesser amounts of dextrin give rise to polymers with an increased "grits" content.

The acrylate monomers which may form part of the acrylate polymer according to the invention are those known and used for this purpose and include one or more of acrylic acid, acrylonitrile, acrylamide and in particular the esters of acrylic acid with C1 to C20 alcohols especially C3 to C10 alcohols such as butyl acrylate. The methacrylic acid equivalents of these acrylic acid derivatives may also be used e.g. methacrylonitrile and hexyl methacrylate. Olefinically unsaturated comonomers which are commonly copolymerised with acrylic monomers and which may form part of the compositions according to the invention include vinyl compounds such as ethylene, vinyl chloride, styrene and vinyl esters of carboxylic acids, particularly carboxylic acids containing up to 20 carbon atoms e.g. vinyl acetate and vinyl hexanoate. Analogous allyl compounds, particularly allyl esters of carboxylic acids may also be comonomers. Copolymers according to the invention comprise the acrylate monomer as the major olefinically unsaturated monomer. Particularly attractive polymer dispersions are those comprising one or more esters of acrylic or methacrylic acid with a $C_3$ to $C_{10}$ alkanol copolymerised with styrene. The unsaturated ester suitably comprises 70 to 95% by weight of the total monomers and the styrene the remainder.

The process by means of which the polymer dispersions according to the invention may be produced comprises dissolving the dextrin in water, usually at an elevated temperature, adding a persulphate and, optionally, a peroxide activator or initiator, adding part of the monomer(s), initiating the polymerisation by the addition over a period of time of a buffer/reducing agent mixture and adding the remainer of the monomer(s) at such a rate as to maintain the temperature of the polymerisation mixture between 40° C. and 90° C. preferably between 50° C. and 80° C. more preferably between 50° C. and 60° C.

A preferred peroxide is hydrogen peroxide, the preferred persulphate ammonium or an alkali metal persulphate particularly potassium persulphate, the preferred reducing agent ascorbic acid. The buffer is such that the pH of the polymerisation medium is maintained between 2.5 and 7 e.g. with ascorbic acid the buffer may be sodium bicarbonate which maintains pH 7.

The amount of peroxide initiator or activator which may be added to the polymerisation mixture is suitably 35 to 60, preferably 40 to 55 millimoles per kilo of the acrylic and other olefinically unsaturated monomer(s); the amount of persulphate is suitably 40 to 120 preferably 50 to 90 millimoles/kilo and the amount of reducing agent suitably 25 to 70 preferably 30 to 55 millimoles/kilo. The dextrin may be dissolved in the water at any temperature up to 85° C. and the higher the temperature the quicker the rate of dissolution. About 15% of the monomer(s) is usually added at the start of the polymerisation, the remainder being added progressively to control the temperature during the polymerisation.

The polymer dispersions according to the invention are particularly useful, by reason of their high total solids content, as adhesives, but may find other applications e.g. as sizing agents.

The dispersions according to the invention and a method for their preparation will now be further described with reference to the following Examples. In the Examples the molecular weights of the dextrins, the tendency of a dispersion to settle and the grit content of a dispersion were measured as follows:

Molecular weight

The molecular weight determinations were made by size exclusion chromatography. The columns used were sulphonated polystyrene—divinylbenzene resins sold by the Showa Denko company under the name Ionpak S800 series. The columns were calibrated with the polysaccharide calibration Kit P-82 (Pullulan) and were eluted with a 0.5% by weight sodium chloride solution.

Settling 10 mls of the dispersion is diluted to 100 ml with distilled water and shaken vigorously. After 24 hours the volume of settled material is measured and expressed on a percent (E.g. 2 ml=2%).

Grit Content 100 grams of the dispersion is washed with water through a 200 micron sieve. The residue (grits) is dried for 2 hours at 130° C. and weighed.

In the Examples the polymer dispersions were prepared by the following sequence of process steps carried out under a nitrogen atmosphere.

(1) 234 grams of the dextrin were dissolved in 500 grams water by heating at 85° C. for one hour.
(2) 2.0 grams of hydrogen peroxide (activator) were added.
(3) 9.9 grams of potassium persulphate (initiator) were added dissolved in 130 grams water.
(4) 72.6 grams of a mixture of n-butylacrylate and styrene were added. This amount is 15% of the total monomer addition (483.8 grams). The monomers were n-butylacrylate (412.2 grams) and styrene (71.6 grams).
(5) Addition of ascorbic acid/sodium bicarbonate solution (4 grams ascorbic acid and 4.3 grams sodium bicarbonate in 70 grams water) was started at a polymerisation medium temperature of 50° C. The addition was progressive over a period of 160 minutes.
(6) The remainder of the monomer(s) was added over a period of 160 minutes.
(7) The polymer dispersion was held at 50° C. for a period of one hour.
(8) The dispersion was cooled below 50° C. and a proprietary bactericide (PIROR P109) added.

The dextrins used in the Examples were as follows:

| Dextrin | Viscosity of the dextrin (30% in water at 40° C.)* in mPas | % of dextrin having m · wt between 1000 and 25000 | % of dextrin having m · wt >25000 | Dispersion value ($\overline{M}_w/\overline{M}_n$) |
|---|---|---|---|---|
| + NOREDUX 200E | 50 | 89.4 | 5.3 | 3.0 |
| DEXTRINA BIANCA | 55 | 87.0 | 6.8 | 6.7 |
| + TACKIDEX J55K | 55 | 81.0 | 12.7 | 5.0 |
| NOREDUX C55 | 200 | 65.0 | 30.7 | 11.1 |

-continued

| Dextrin | Viscosity of the dextrin (30% in water at 40° C.)* in mPas | % of dextrin having m · wt between 1000 and 25000 | % of dextrin having m · wt >25000 | Dispersion value ($M_w/M_n$) |
|---|---|---|---|---|
| NOREDUX C15 | 1200 | 51.0 | 46.5 | 12.7 |

*Brookfield viscosity 20 rpm. spindle speed.
+ NOREDUX and TACKIDEX are trademarks.

The properties of the polymer dispersions produced using the above method with the five dextrins are given below.

| | Dextrin | | |
|---|---|---|---|
| | NOREDUX 200E | DEXTRINA BIANCA | TACKIDEX J55K |
| Total Solids | 48.7 | 49.0 | 48.8 |
| Monomer conversion | 97.5 | 99.7 | 99.2 |
| Settling | NIL | NIL | NIL |
| Grits (g/100 g) | 0.0026 | 0.0008 | 0.0034 |
| Average particle size (microns) | 0.33 | 0.40 | 0.31 |
| Viscosity (mPas)* | | | |
| initial | 230 | 1100 | 1800 |
| 24 hours | 350 | 2400 | 4550 |
| 5 days | 500 | 6050 | |
| 10 days | 560 | 6800 | 4900 |
| 20 days | 640 | 8500 | 6400 |
| 30 days | 640 | 10000 | 12500 |
| 40 days | 670 | 11400 | 15750 |
| 50 days | 670 | 11400 | — |
| Viscosity index** | 1.35 | 2.16 | 2.43 |

*Determined by a Brookfield viscometer spindle speed 20 rpm.
**Viscosity index is the viscosity at spindle speed 10 rpm divided by the viscosity at spindle speed 50 rpm.

The polymer dispersions made from NOREDUX C55 and NOREDUX C15 had the consistency of thick puddings 90 minutes after their preparation and were not investigated further.

The results demonstrate the premium properties, particularly with respect to viscosity, of the polymer dispersions according to the present invention. They also indicate that the viscosity of the dextrin does not enable an accurate qualitative prediction to be made of the viscosity of the polymer dispersion incorporating that dextrin.

We claim:

1. An aqueous acrylate polymer dispersion which has a total solids content of 30 to 60% by weight and which has been made by polymerizing one or more acrylate monomers, optionally together with other olefinically unsaturated monomer(s), in the presence of a dextrin, said dextrin being the degradation product produced by heating a starch, with or without the addition of chemical reagents, at least 70% of said dextrin having a molecular weight in the range of 1000 to 25,000 and not more than 10% of said dextrin having a molecular weight above 25,000.

2. An aqueous polymer dispersion according to claim 1 characterised in that at least 85% of the dextrin has a molecular weight in the range 1000 to 25000.

3. An aqueous polymer dispersion according to claim 1 characterised in that not more than 6% of the dextrin has a molecular weight above 25000.

4. An aqueous polymer dispersion according to claim 1 characterised in that the dispersibility of the dextrin is less than 5.

5. An aqueous polymer dispersion according to claim 1 characterised in that the dextrin comprises 15 to 60% by weight of the total solids in the dispersion.

6. An aqueous polymer dispersion according to claim 1 characterised in that the acrylate is acrylic acid, acrylonitrile, acrylamide, one or more esters of acrylic acid with a $C_1$ to $C_{20}$ alcohol or the methacrylic acid equivalent of these acrylic acid derivatives.

7. An aqueous polymer dispersion according to claim 1 characterised in that the optional olefinically unsaturated monomer is a vinyl or alkyl compound.

8. A process for the production of aqueous polymer dispersion according to claim 1 characterised in that
   (a) the dextrin is dissolved in water,
   (b) a persulphate and, optionally a peroxide, is added,
   (c) part of the monomer(s) is added,
   (d) the polymerisation is initiated by adding a buffer/reducing agent mixture over a period of time,
   (e) the remainder of the monomer(s) is added at such a rate as to maintain the temperature of the polymerisation mixture between 40° and 90° C.

9. A process according to claim 8 characterised in that the peroxide is hydrogen peroxide, the persulphate is ammonium, sodium or potassium persulphate, the reducing agent is ascorbic acid, the buffer is sodium bicarbonate and the temperature is 50° to 60° C.

10. A process according to claim 8 characterised in that amount of peroxide is 35 to 60 millimoles/kilo of monomers, the amount of persulphate is 40 to 120 millimoles/kilo of monomers and the amount of reducing agent 25 to 70 millimoles/kilo of monomers.

* * * * *